US009989780B2

(12) United States Patent
Boorman et al.

(10) Patent No.: US 9,989,780 B2
(45) Date of Patent: Jun. 5, 2018

(54) CORKIES SUNGLASSES HOLDER

(71) Applicants: Shawn Boorman, Stuart, FL (US);
Heather Boorman, Stuart, FL (US)

(72) Inventors: Shawn Boorman, Stuart, FL (US);
Heather Boorman, Stuart, FL (US)

( * ) Notice: Subject to any disclaimer, the term of this patent is extended or adjusted under 35 U.S.C. 154(b) by 148 days.

(21) Appl. No.: 15/001,292

(22) Filed: Jan. 20, 2016

(65) Prior Publication Data
US 2017/0205638 A1 Jul. 20, 2017

(51) Int. Cl.
G02C 3/00 (2006.01)
G02C 11/00 (2006.01)

(52) U.S. Cl.
CPC ............. G02C 3/006 (2013.01); G02C 3/003 (2013.01); G02C 11/00 (2013.01)

(58) Field of Classification Search
CPC ........ G02C 11/00; G02C 3/003; G02C 3/006; B63B 35/85; B63B 22/00
See application file for complete search history.

(56) References Cited

U.S. PATENT DOCUMENTS

| | | | | |
|---|---|---|---|---|
| 5,019,000 A | * | 5/1991 | Stephens | B63B 22/00 351/43 |
| D327,697 S | * | 7/1992 | Vines | D16/339 |
| D368,272 S | * | 3/1996 | Starr | D16/339 |
| 5,664,291 A | * | 9/1997 | Stoller | G02C 3/003 24/3.3 |
| 5,673,094 A | * | 9/1997 | Bahouth | G02C 3/003 351/148 |
| D673,997 S | * | 1/2013 | Rohrbach | D16/330 |
| 2003/0101542 A1 | * | 6/2003 | Mackay | G02C 3/003 24/3.4 |
| 2012/0307199 A1 | * | 12/2012 | Krisik | G02C 3/003 351/157 |
| 2014/0362337 A1 | * | 12/2014 | Cheng | G02C 3/003 351/156 |

OTHER PUBLICATIONS

Make a Log from a Newspaper + 57 More Hunting, Fishing and Camping Tips from the Readers of Field & Stream; Field & Stream Magazine website; http://www.fieldandstream.com/photos/gallery/guns/rifles/shooting-tips/2011/03/fishing-hunting-survival-tips-tricks-readers; Mar. 8, 2011.*

(Continued)

Primary Examiner — Daniel J Colilla

(57) ABSTRACT

Embodiments of the present disclosure relate generally to a sunglasses or eyeglasses holder. The holder generally includes a wine cork on a monofilament line. Ends of the line are secured in a crimp. Optionally, the ends may be sealed within a portion of a heat shrink wrap tube. The other end of the heat shrink wrap tube can be secured to the ends of glasses temples. In another example, monofilament line may be secured/crimped with respect to the glasses temple. The holder described herein provides a flotation feature due to the buoyancy of the wine cork. The holder described herein can also optionally be secured to a wearer's sunglasses by applying heat to the heat shrink wrap. Alternatively, the user may tie and crimp the holder it in place with respect to an existing hole in the glasses temple. Embodiments also relate to methods for manufacturing a sunglasses or eyeglasses holder described herein.

11 Claims, 5 Drawing Sheets

(56) References Cited

OTHER PUBLICATIONS

The Hull Truth Boating Forum; http://www.thehulltruth.com/sportfishing-charters-forum/286979-any-sunglass-safety-cords-won-t-fall-off-apart.html; entry #5; Jun. 3, 2010.*
How to make a paracord glasses holder; Paracord Guild website; https://web.archive.org/web/20150206035904/http://www.paracordguild.com:80/make-paracord-eyeglasses-holder/; Feb. 6, 2015.*
North Carolina Prepper; Super quick paracord glasses holder; YouTube video: https://www.youtube.com/watch?v=walzo4WfiOk; Sep. 13, 2013.*
Cabela's Online Store; http://www.cabelas.com/product/home/costa-sunglasses/pc/105625080/c/112151880/costa-reg-strap-rope-sunglasses-holder/1172312.uts?slotId=1; accessed Dec. 13, 2017; published Nov. 21, 2006.*
Farlows Online Store; https://www.farlows.co.uk/costa-del-mar-costa-strap.html, accessed Dec. 13, 2017; published Apr. 13, 2015.*

* cited by examiner

CORKIES SUNGLASSES HOLDER

FIELD OF THE DISCLOSURE

Embodiments of the present disclosure relate generally to a sunglasses or eyeglasses holder. The holder generally includes a wine cork on a monofilament line. Ends of the line are secured in a crimp. Optionally, the ends may be sealed within a portion of a heat shrink wrap tube. The other end of the heat shrink wrap tube can be secured to the ends of glasses temples. In another example, monofilament line may be secured/crimped with respect to the glasses temple. The holder described herein provides a flotation feature due to the buoyancy of the wine cork. The holder described herein can also optionally be secured to a wearer's sunglasses by applying heat to the heat shrink wrap. Alternatively, the user may tie and crimp the holder it in place with respect to an existing hole in the glasses temple. Embodiments also relate to methods for manufacturing a sunglasses or eyeglasses holder described herein.

BACKGROUND

Many sunglasses or eyeglasses wearers lose their glasses during strenuous or other athletic activities. For example, surfers, body boarders, fishermen, paddle boarders and other water sports enthusiasts often wear sunglasses because their activities occur during the brightest parts of the day. However, because these activities often involve quick movements, it is very easy to lose sunglasses.

Although there are sports-type sunglasses holders on the market, such as Croakies® and other brands, these holders do not provide a flotation feature for the glasses. Accordingly, it is desirable to provide a sunglasses holder that is convenient, inexpensive, and fun to wear.

BRIEF DESCRIPTION OF THE DRAWINGS

FIG. 7A shows a side cross-sectional view of the angled retention member in place on a glasses temple, illustrating a rear opening portion supporting and securing a monofilament line and crimp; and a larger front opening receiving a glasses temple tip. FIG. 7B shows a side plan view of the angled retention member of FIG. 7A. FIG. 7C shows an exploded view of a monofilament line/crimp, angled retention member, and glasses temple, prior to assembly of the monofilament line/crimp within the angled retention member and prior to assembly of the glasses holder onto the glasses temple.

DETAILED DESCRIPTION

The present inventors have found that the Corkies sunglasses holder described herein may be made inexpensively and quickly. The resulting product has been found to be a fun and interesting conversation piece. It has also been found to be a very effective way of maintaining a user's sunglasses secured to his/her head, while also providing a flotation feature if the sunglasses are dislodged.

Figure 1:
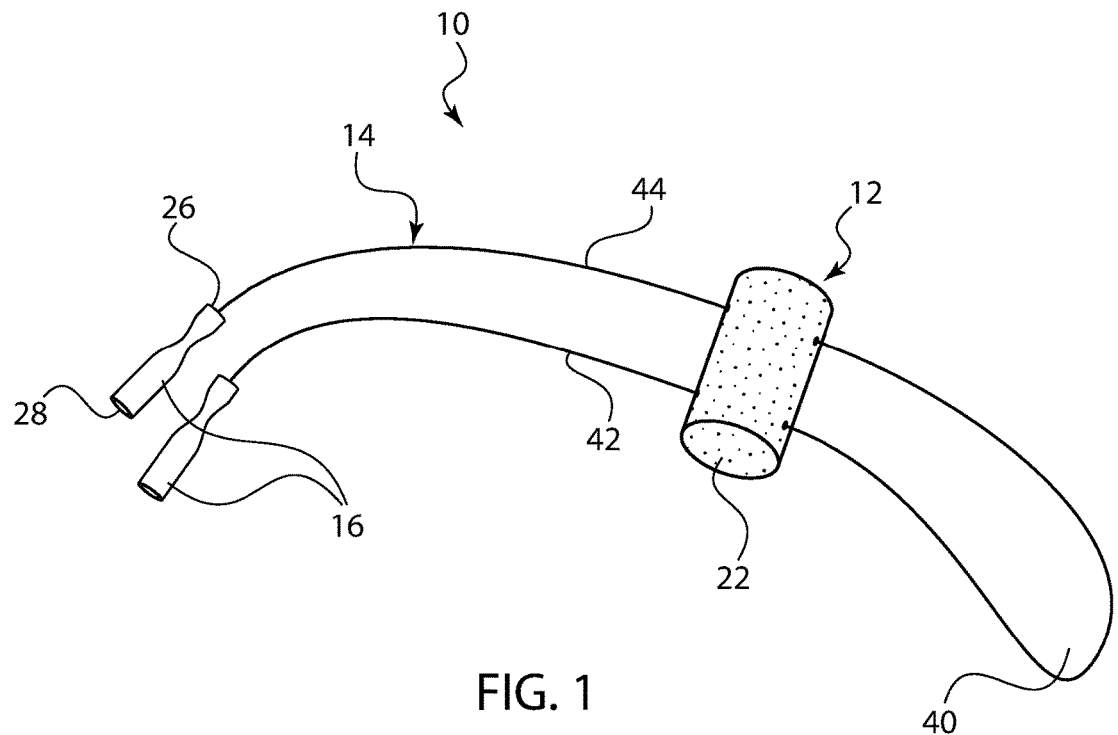
FIG. 1 shows a top perspective view of one embodiment of a corkies sun glasses holder described herein.
Figure 2:
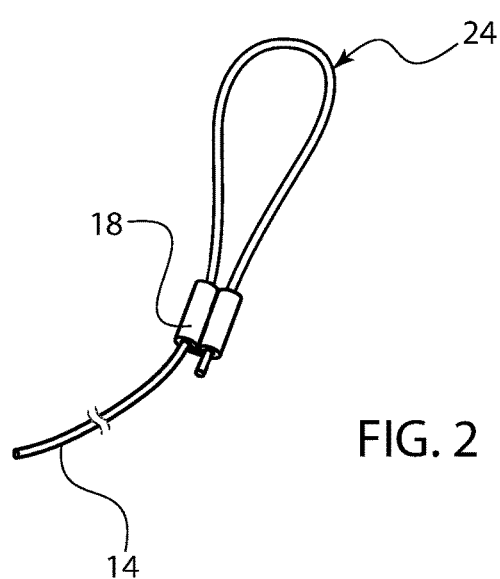
FIG. 2 shows a perspective view of one end of monofilament line that is looped and crimped into a crimping element.

As shown in FIG. 1, in one example, the holder 10 generally comprises a wine cork 12, monofilament fishing line 14, and heat shrink tubing 16. As shown in FIG. 2, one end of the monofilament line 14 is inserted into a crimp element 18.

In order to manufacture the holder 10, two small holes 20 may be drilled through the wine cork 12. The wine cork 12 may be a standard wine cork that is of a cork material, a plastic material, or any other generally buoyant material. The holes 20 are generally drilled slightly inward from wine cork ends 22. The holes 20 should be slightly larger than the mono filament line 14 used, but not so large that the cork slides too easily along the line 14. In one specific embodiment, 150 pound test monofilament line 14 may be used. The drillbit used to form holes 20 may be a 1/16 inch drill bit. This size has been found to work particularly well in order to provide a hole size that allows the cork to slide along 150 pound test line, but to remain secured in position along the line once the sliding pressure is removed. It should be understood, however, that these examples are provided for illustration only and are not intended to be limiting in any way. A different size drill bit may be used with differently-sized line to create a desired tension/friction level with respect to the cork and the line.

Figure 4:
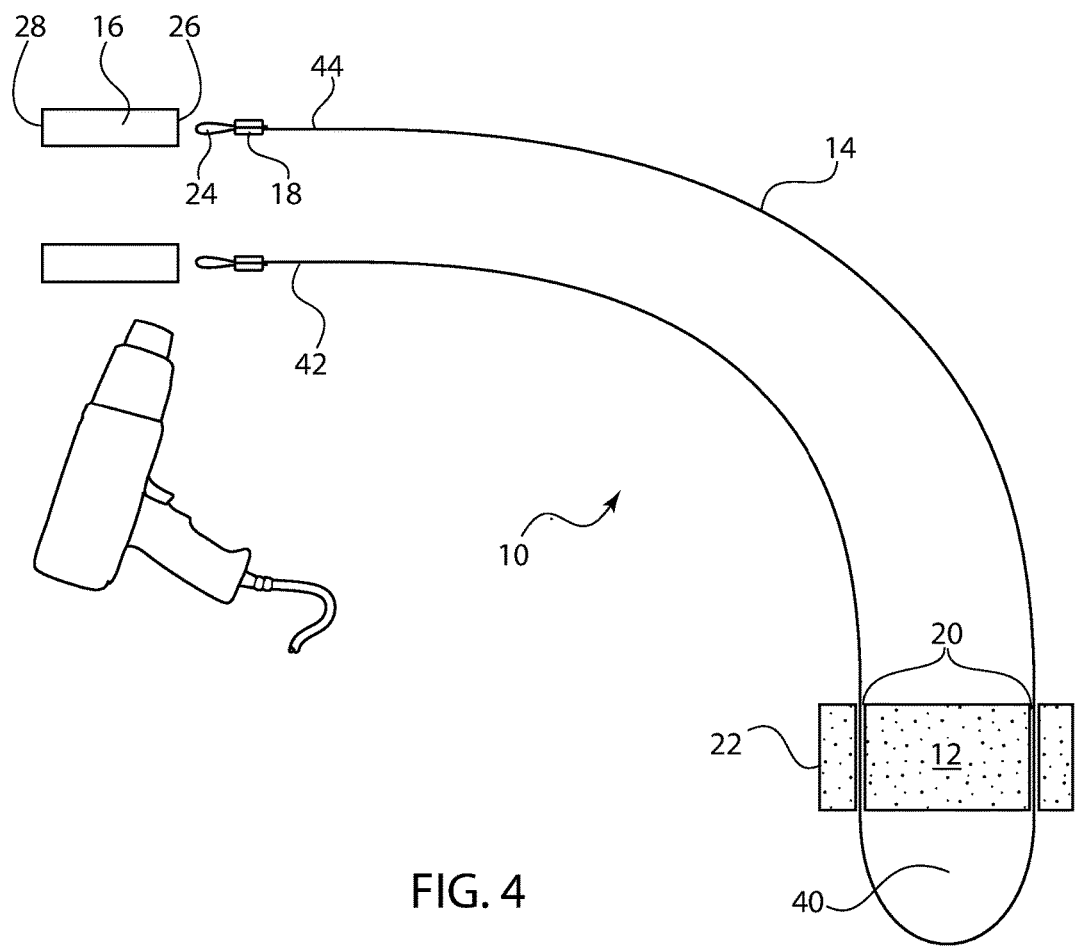
FIG. 4 shows a perspective view of heat being applied to the crimped end and heat shrink tubing portion, in order to cause the heat shrink tubing to wrap around the crimp element and line.
Figure 5:
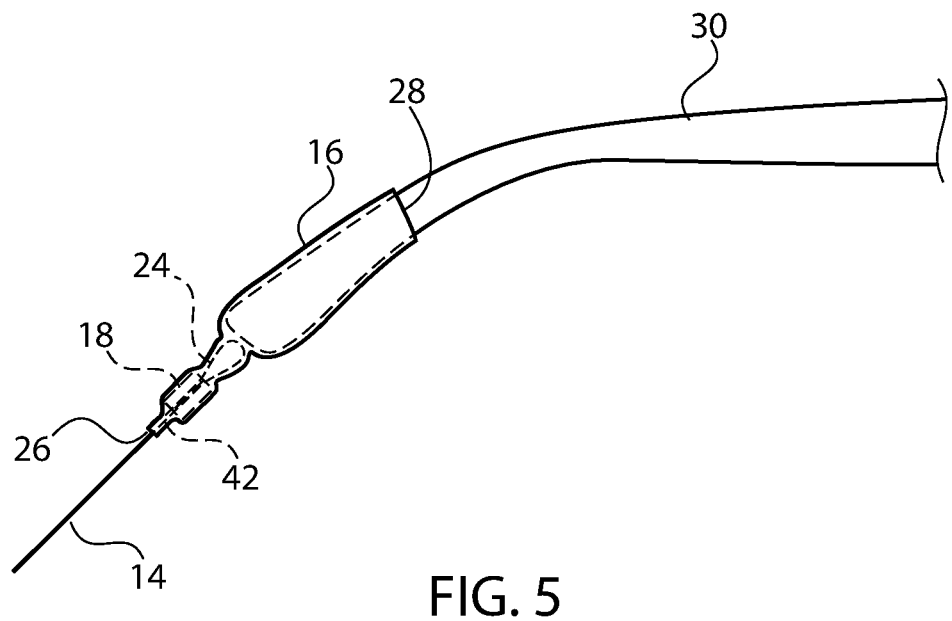
FIG. 5 shows a side schematic view of heat shrink tubing securing crimped monofilament line to a glasses temple.

Once the holes 20 have been formed in the wine cork 12, an appropriate length of monofilament line 14 may be cut and inserted through the holes 20. In one specific embodiment, 24 inches of line 14 may be used. The line 14 is threaded through the holes 20 in order to create a loop 40 extending from one side of the wine cork 12. First and second ends 42, 44 of the line may extend from the other side of the wine cork 12. As shown in FIGS. 4 and 5, each of the ends 42, 44 of the line 14 may be looped through an aluminum crimping element 18 and curved back into the element 18 to create a small loop 24. Pliers or any other crimping tool may be used to crimp down onto the crimping element 18 in order to secure the line 14 in place. The same step is done with the other end of the line 14.

Figure 3:
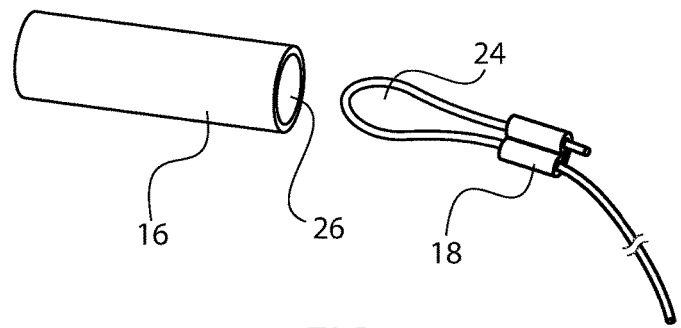
FIG. 3 shows a perspective view of a crimped end prior to its being positioned within an end of a heat shrink tubing portion.

Next, a portion of heat shrink tubing 16 is provided. One example is shown in FIG. 3. In one specific embodiment, the heat shrink tubing may be about a 2 inch segment of a ¼" heat shrink tubing. One end 26 of the portion of heat shrink tubing 16 is positioned over the monofilament loop 24 and the crimp element 18. A heat torch, lighter, heat element, or other heat-producing element may apply heat to the heat shrink tubing 16 in order to cause it to shrink and slightly melt over the loop 24 and crimping element 18. An example of this heating step is shown in FIG. 4. This same step is done with the other end of the line 14. The resulting holder 10 is shown in FIG. 1.

As shown in FIG. 4, each heat shrink tubing portion 16 has one end 26 that is shrunk around the crimp 18 and another end 28 that is open. The open end 28 is configured to slide onto the end of a sunglasses temple 30, as is shown in FIG. 5. It is possible for this to be an interference fit, such that the heat shrink tubing open end 28 fits snugly with respect to temple 30. It is also possible for the user to apply heat at the junction of tubing end 28 and the temple 30 in order to heat shrink the open end 28 into place.

More specifically, as illustrated by FIGS. 4 and 5, the Corkies holder may be attached to temple 30 tip by taking the end of the looped and crimped monofilament line, and inserting it approximately ¾" into one end 26 of an approximately 2" long by ¼" wide piece of heat shrink tubing 16. The ¾" end with the crimped monofilament loop inside is then heated with a heat source until it shrinks to the shape of the crimped monofilament end. The remaining 1¼" end 28 of the heat shrink tube 16 is left unheated and un shrunk. It may later be attached to the temple tip 30, where it can be heated until it shrinks to the shape of temple tip. In other examples, the remaining end 28 may simply be friction fit with respect to the sunglasses temple 30. In this example, the Corkies holder 10 may be reusable for different pairs of sunglasses.

Figure 6:
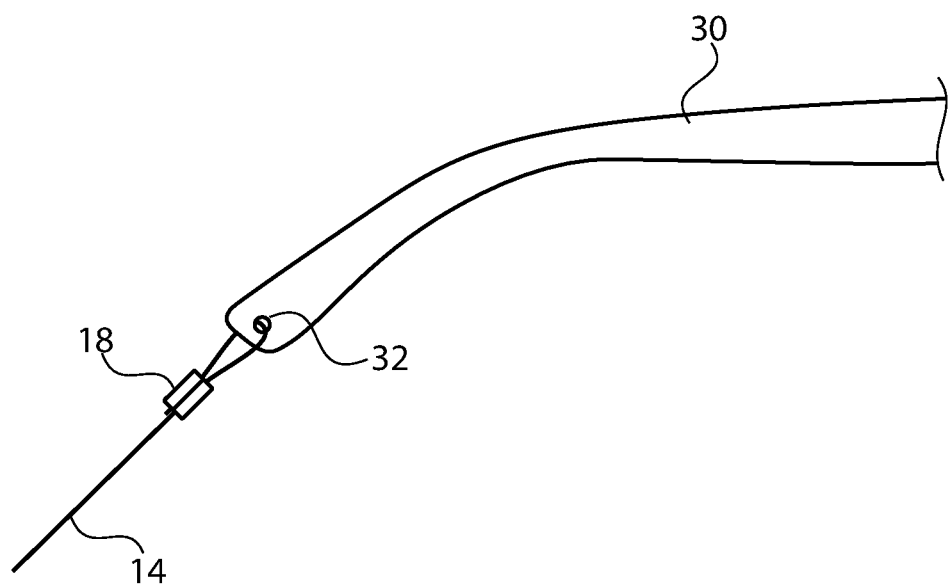
FIG. 6 shows a side schematic view of crimped monofilament line being secured to an existing hole in a glasses temple.

As illustrated by FIG. 6, in another embodiment, it is possible for the Corkies holder to be attached to temple tip 30 by inserting the monofilament line 14 through a pre-drilled or existing hole 32 in the end of the temple tip. The monofilament line 14 may then be looped back into a crimp, creating a secure loop. The user may simply apply pressure to a crimp element 18 in order to make this securement occur.

Figure 7A:
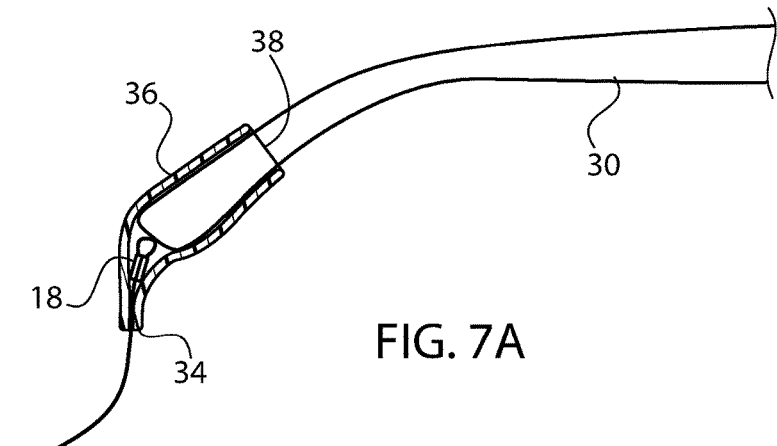
FIGS. 7A-7C show views of an angled retention member used to secure crimped monofilament line to a glasses temple.
Figure 7B:
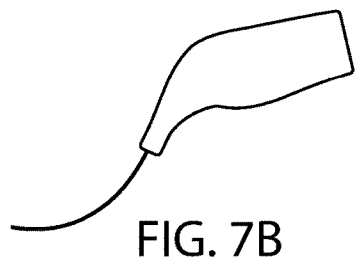
Figure 7C:
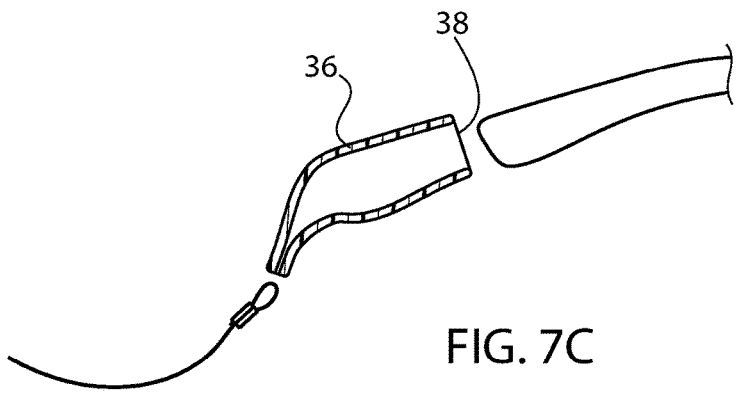

In a further example illustrated by FIGS. 7A-C, the Corkies holder may be attached to a temple tip 30 using, a rubber retention 36. For example, monofilament line 14 may be inserted into a small opening end 34 of a rubber retention 36. Once the monofilament line 14 is completely through and projecting outside a larger opening 38 of the rubber retention 36, a crimp 18 may be threaded onto the line 14 and the line 14 is looped back into the crimp 18. The crimped monofilament loop is then pulled back into the rubber retention 36 toward the small opening 34 until it is stopped by the decrease in hole size inside the rubber retention 36. The larger opening 38 of the rubber retention 36 is then slid over the end of the temple tip 30.

Figure 8:
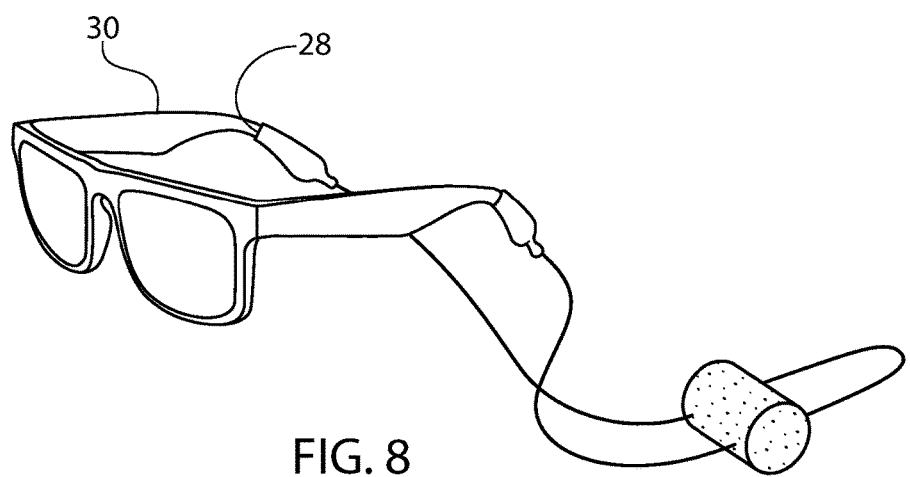
FIG. 8 shows a Corkies holder in position on a user's sunglasses.
Figure 9:
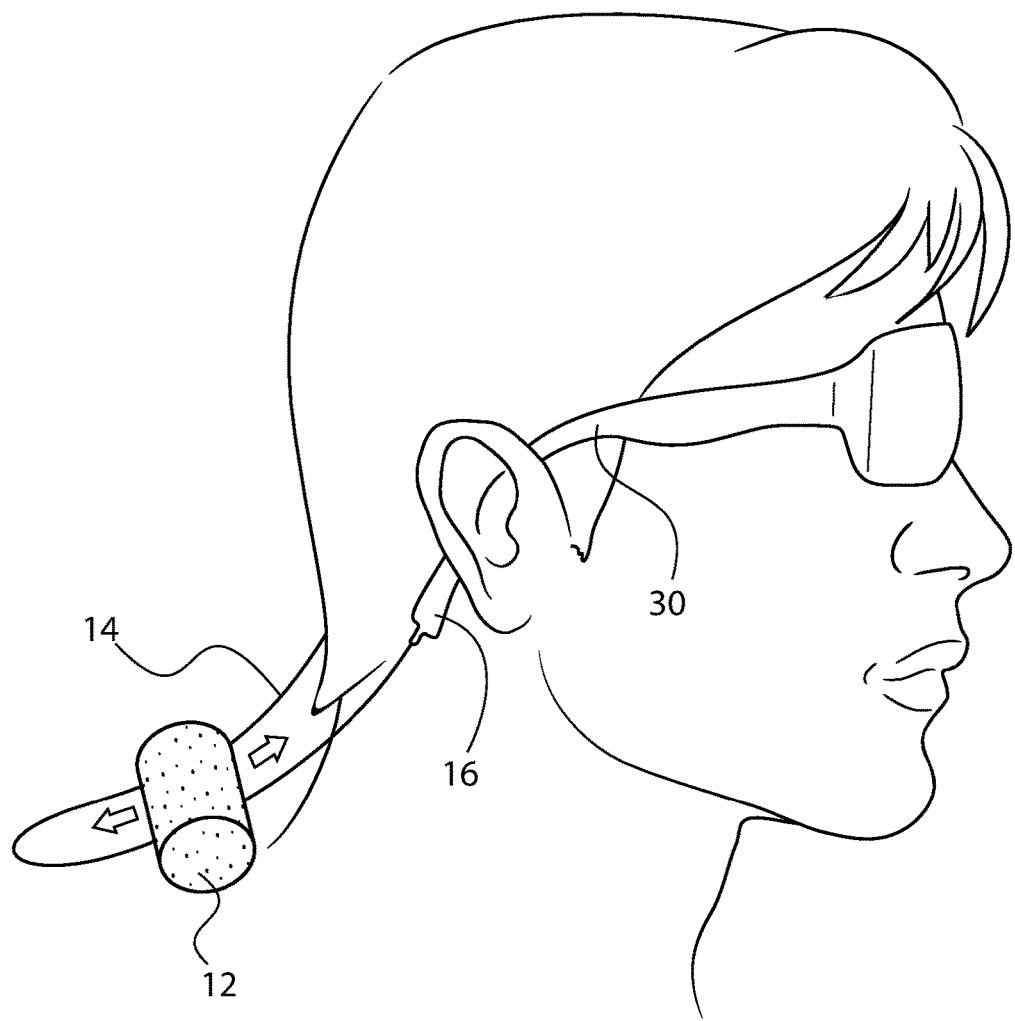
FIG. 9 illustrates how the wine cork may be moved up and down in order to loosen or tighten the holder onto a wearer's head.

In use, as shown in FIGS. 8 and 9, the wearer may slide the monofilament line 14 and cork 12 around the back of his/her head, while putting the sunglasses temple 30 around his/her ears in the usual manner. The cork 12 may then be slid up and or down the monofilament line 14 in order to tighten or loosen the holder 10.

Although specific embodiments and methods of manufacture have been described, it should be understood that other materials and methods are possible and within the scope of this disclosure. For example, instead of monofilament line, it is possible to use yarn, ribbon, wire, thin rope, twine or any other appropriate string-like material.

Changes and modifications, additions and deletions may be made to the structures and methods recited above and shown in the drawings without departing from the scope or spirit of the disclosure or the following claims.

What is claimed is:

1. A glasses holder, comprising:
   a wine cork secured to a monofilament line, wherein the monofilament line creates a loop extending from one portion of the wine cork and first and second ends extending from another portion of the wine cork;
   a first crimp element secured to the first end of the monofilament line;
   a second crimp element secured to the second end of the monofilament line;
   a first angled retention member configured to receive the first crimp element; and
   a second angled retention member configured to receive the second crimp element, wherein
   the first and second angled retention members each comprise (i) a rear opening portion supporting a line/crimp element interface and defining a thin monofilament line channel, (ii) a larger front opening for receiving a glasses temple tip, and (iii) an angled shape before it is placed on the glasses temple tip, wherein the larger front opening is continuous with the thin monofilament line channel and wherein the angled shape has a first portion that is substantially the same as the large diameter and a second portion that tapers from substantially the large diameter to the smaller rear opening such that the first and second portions of the angled shape form a continuously smooth curved shape that directs the monofilament line at a non-parallel angle to the temple tip when the retention member is mounted on the temple tip.

2. The holder of claim 1, wherein each of the first and second angled retention members comprise a rubber retention for securing crimped ends of monofilament line to a temple tip of the glasses.

3. The holder of claim 1, wherein the monofilament line comprises 150 pound test line.

4. The holder of claim 1, wherein the first and second angled retention members comprise about 2 inch segments of ¼ inch diameter.

5. The holder of claim 1, where in the wine cork is configured to slide up and down the monofilament line in order to tighten and loosen the holder.

6. The holder of claim 1, wherein the first and second angled retention members each comprise a body between the rear opening portion and the larger front opening, the body defining an angle that causes the rear opening portion and the larger front opening to define opening axes that are not aligned with one another.

7. A method of manufacturing a sunglasses or eyeglasses holder, comprising:
   drilling two holes in a wine cork;
   threading monofilament line through the holes in order to create a loop extending from the wine cork on one side and first and second ends of line extending from the wine cork on another side;
   providing first and second angled retention members, each having a smaller end and a larger end, the smaller end defining a thin monofilament line channel, wherein the angled retention member comprises an angled shape before it is placed on the glasses temple tip, wherein the larger end is continuous with the thin monofilament line channel and wherein the angled shape has a first portion that is substantially the same as the large diameter and a second portion that tapers from substantially the larger end to the smaller end opening such that the first and second portions of the angled shape form a continuously smooth curved shape that directs the monofilament line at a non-parallel angle to the temple tip when the retention member is mounted on the temple tip;

inserting the first end of line into the smaller end of the first angled retention member;

looping the first end of line with a first crimp element;

inserting the second end of line into the smaller end of the second angled retention member;

looping the second end of line with a second crimp element; and pulling the monofilament line taut within the monofilament line channel.

8. The method of claim 7, further comprising sliding the larger end of each of the angled retention members over temple tips of glasses.

9. The method of claim 7, further comprising sliding the wine cork up and down the monofilament line in order to tighten and loosen the holder.

10. A retention member, comprising:

a first rear end opening sized and configured to receive and secure a monofilament line with a crimp positioned thereon within a channel of the retention member, the rear end opening defining a thin monofilament line channel; and a second larger front opening sized and configured to receive and secure a glasses temple tip, wherein a body of the retention member between the first rear end opening and the second larger front opening comprises an angle that causes the first rear end opening and the second larger front opening to define opening axes that are not aligned with one another, wherein the retention member comprises an angled shape before it is placed on the glasses temple tip, wherein the second larger end is continuous with the thin monofilament line channel and wherein the angled shape has a first portion that is substantially the same as the second larger end and a second portion that tapers from substantially the second larger end to the first rear end opening such that the first and second portions of the angled shape form a continuously smooth curved shape.

11. The retention member of claim 10, further comprising a channel between the first rear end and the second larger front opening.

* * * * *